Patented Nov. 25, 1952

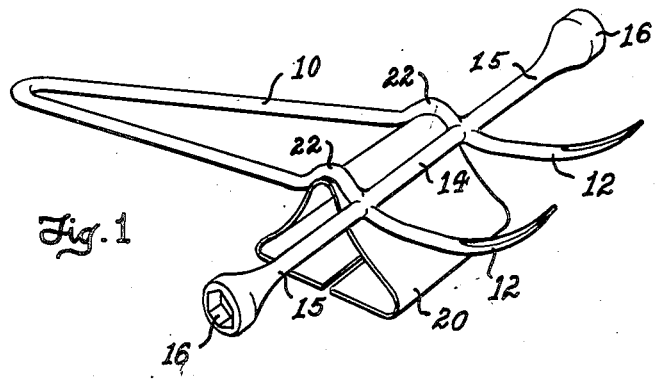
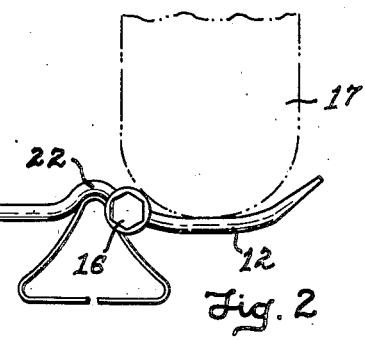
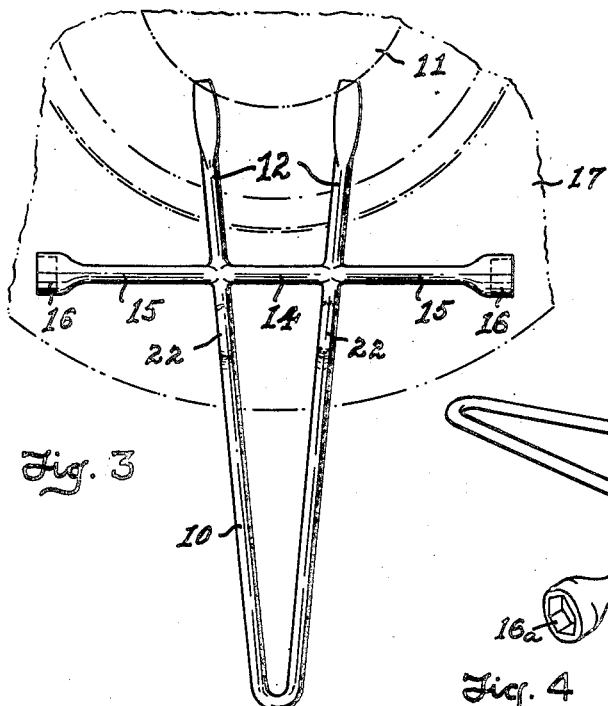
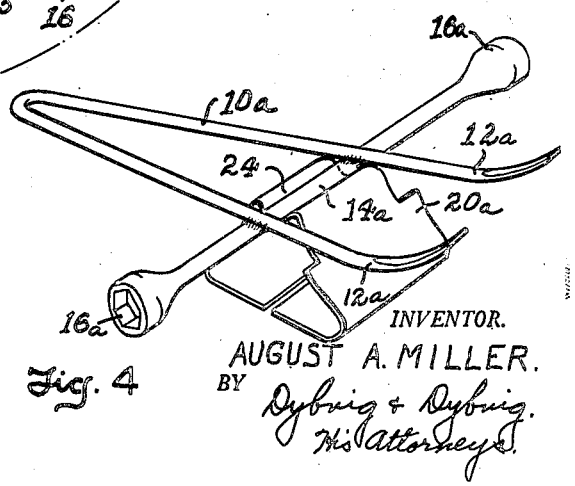

2,619,320

UNITED STATES PATENT OFFICE 2,619,320

TIRE LIFTER WITH FULCRUM ELEMENT

August A. Miller, Springfield, Ohio

Application January 8, 1951, Serial No. 204,840

1 Claim. (Cl. 254—131)

This invention relates to a tire changing device and more particularly to a specially constructed, low cost, multiple purpose tire tool.

It is an object of this invention to provide a unitary, all purpose tire changing tool in which a number of tools have been combined into one tool in such a manner that each tool in the combination cooperates with the other tools so as to function in an improved manner.

In most modern cars the clearance between the fender and the tire is not very great, with the result that it is difficult for one individual to lift the tire into place without the aid of a tire lifting tool of some kind. A large number of devices have been devised from time to time for lifting the tires into place, but these have been open to numerous objections, such as being too expensive to manufacture, too bulky, impractical in use, et cetera.

It is an object of this invention to provide a combined tire lifting device and a tire changing device in the form of a single tool which may be made very cheaply and which can be used very effectively to remove the hub cap, remove the wheel retaining nuts, lift the replacement tire and wheel into place, and to quickly and securely tighten the nuts which hold the wheel in place.

One object of this invention is to provide a tire changing device which includes an improved tool arrangement for engaging underneath the hub cap at spaced points for prying the hub cap loose and wherein the wrench part of the tool serves as a fulcrum during the prying operation.

Still another object of this invention is to provide an improved tool comprising a tire lifting device in which the hub cap prying means consists of two cradle-like projections which may also be used for the purpose of engaging the bottom side of the tire at spaced points, so as to enable one to effectively raise the tire and its associated wheel into proper alignment with the wheel supporting lugs without the danger of the tire rolling off the lifting device.

Other objects and advantages reside in the construction of parts, the combination thereof and the mode of operation, as will become more apparent from the following description.

Referring now to the drawing:

Figure 1 is a perspective view of a preferred form of my invention;

Figure 2 is a side elevational view showing the tool used in lifting a tire in place;

Figure 3 is a plan view showing the same tool used for removing a hub cap; and

Figure 4 is a perspective view of an alternative form of tool somewhat similar to the tool shown in Figures 1–3.

Referring now to Figure 1 of the drawing wherein I have shown a preferred embodiment of my invention; reference numeral 10 designates a somewhat hairpin shaped member having the ends thereof provided with curved tire engaging cradle-like elements 12. A crossrod 14 is provided, as shown, for adding rigidity to the assembly. The crossrod 14 serves a further purpose in that the ends thereof are made up in the shape of a pair of socket wrenches 16 which may be used in removing nuts from the wheel supporting lugs on the chassis of a car (not shown).

Each of the ends of the hairpin shaped member 10 is flattened like a screwdriver, so as to make it possible to use the tool both as a screwdriver and also as a tool for prying off a hub cap 11 in the manner illustrated in Figure 3. Since hub caps must be fastened on very tightly in order to prevent them from jarring loose when the car strikes a bump or the like, there is much to be gained by providing the double screwdriver effect for prying the hub cap loose. Furthermore, the extended portions 15 of the crossrod or wrench-like member 14 serve to engage the tire 17, as best shown in Figure 3, so as to provide a fulcrum for use in prying off the hub cap. Thus, the crossrod 14 in reality serves three or more distinct purposes in that it not only serves as a reinforcing member for holding the cradle-like portions 12 in proper spaced relationship, but also serves to support the socket wrenches, as well as serving as a fulcrum or pivot during the hub cap removing operation.

As best shown in Figure 1, a sheet metal stamping 20 is provided as a fulcrum for use in the operation of lifting the tire. The side arms or legs of the hairpin shaped member 10 are slightly curved or deflected, as indicated at 22, so as to prevent the tool from slipping off the fulcrum during a tire lifting operation. If desired, the fulcrum element 20 may be welded or otherwise secured to the member 10, so as to form a completely unitary device. The fulcrum element having a substantially triangular cross sectional area is preferably shaped as shown, so as to provide a firm support for the tool 10 even though the ground may be uneven or soft.

In Figure 4 of the drawing I have shown a slightly modified arrangement wherein the fulcrum 20a is arranged to directly engage a portion of the crossbar 14a secured to the handle or tire lifting member 10a. The fulcrum member 20a, which corresponds to the fulcrum member 20 shown in Figures 1-3, is provided with a reentrant portion 24 in its upper surface for engaging and partially surrounding the crossbar 14a as shown. The crossbar 14a may be formed as a separate element which is welded to the hairpin shaped handle element or it may be cast or forged integrally with the hairpin shaped handle element 10a, if desired.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A device for use in association with tires, comprising a fulcrum element, said fulcrum element being triangular in cross-sectional area with one side resting upon a supporting surface, a tire lifting member comprising a one-piece substantially hairpin-shaped rod element having the free ends thereof curved, the medial portions of the legs of the hairpin-shaped rod element being deflected in the vicinity of the fulcrum element, the medial deflected portions resting upon the fulcrum element, said hairpin-shaped rod element lying in a common plane with the exception of the deflected portions resting upon the fulcrum element and the curved free ends, and a transverse bar extending across the legs in the vicinity of the deflected portion of the legs, said transverse bar being welded to the legs so as to reinforce the legs in the vicinity of the fulcrum element.

AUGUST A. MILLER.

REFERENCES CITED

The following references are of record in the file of this patent:

UNITED STATES PATENTS

| Number | Name | Date |
|---|---|---|
| 416,990 | Campbell | Dec. 10, 1889 |
| 1,392,885 | Battelle | Oct. 4, 1921 |
| 1,965,260 | Rosenberg | July 3, 1934 |
| 2,207,443 | Schneider | July 9, 1940 |
| 2,212,716 | Noble | Aug. 27, 1940 |
| 2,430,001 | McCollum | May 6, 1947 |
| 2,504,345 | Nellis | Apr. 18, 1950 |